(12) United States Patent
Caster

(10) Patent No.: US 9,077,159 B2
(45) Date of Patent: Jul. 7, 2015

(54) ELECTRICAL METERING AND SWITCHING EQUIPMENT

(75) Inventor: Don Caster, Westchester County, NY (US)

(73) Assignee: Electrotech Service Equipment Corporation, Long Island City, NY (US)

( * ) Notice: Subject to any disclaimer, the term of this patent is extended or adjusted under 35 U.S.C. 154(b) by 949 days.

(21) Appl. No.: 13/246,331

(22) Filed: Sep. 27, 2011

(65) Prior Publication Data

US 2013/0076342 A1    Mar. 28, 2013

(51) Int. Cl.
*G01R 15/18* (2006.01)
*H02B 1/03* (2006.01)

(52) U.S. Cl.
CPC ......................................... *H02B 1/03* (2013.01)

(58) Field of Classification Search
None
See application file for complete search history.

(56) References Cited

U.S. PATENT DOCUMENTS

| | | | | | |
|---|---|---|---|---|---|
| 3,525,906 | A | * | 8/1970 | Schubert | 361/643 |
| 3,585,456 | A | * | 6/1971 | Phillips, Jr. | 361/663 |
| 4,413,306 | A | * | 11/1983 | Erickson | 361/648 |
| 5,414,590 | A | * | 5/1995 | Tajali | 361/669 |

OTHER PUBLICATIONS

Standard Products Catalog by Delta Metal Products Co., Inc, Brooklyn, NY, 52 pages.
Distributor Catalog by NAV-TECH incorporated, Brooklyn, NY, 36 pages.

* cited by examiner

*Primary Examiner* — Paresh Patel
(74) *Attorney, Agent, or Firm* — Gottlieb, Rackman & Reisman, PC

(57) ABSTRACT

An electrical service equipment provides electrical service to a building or other similar venue. The equipment includes a cabinet with two portions structured to hold a meter pan and a switch, respectively. The switch is preferably an HCP switch. The portion holding the meter pan includes a subassembly including two horizontal plates and a plurality of buses passing through the plate and adapted to provide connection to the current and voltage transformers of the meter pan.

16 Claims, 6 Drawing Sheets

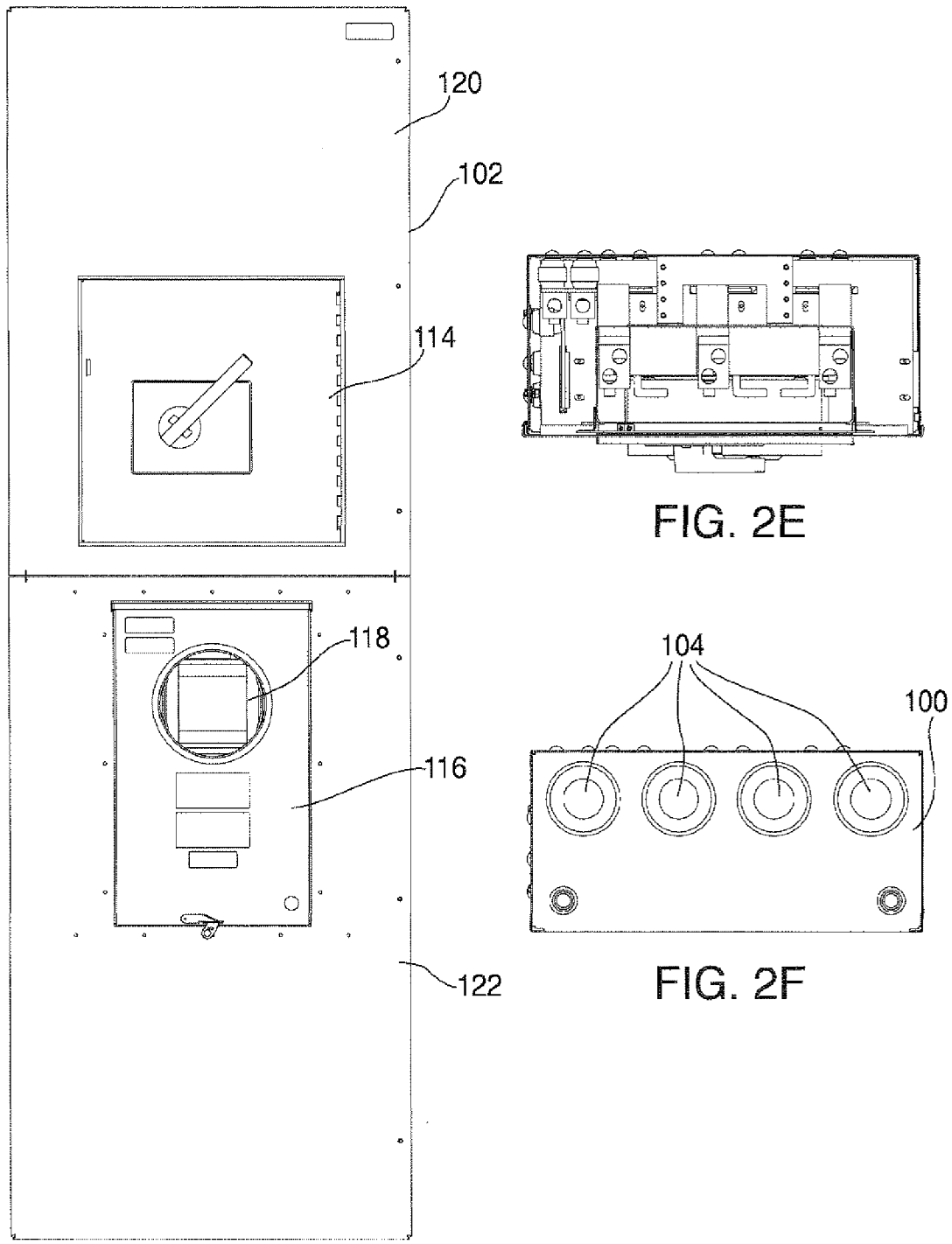

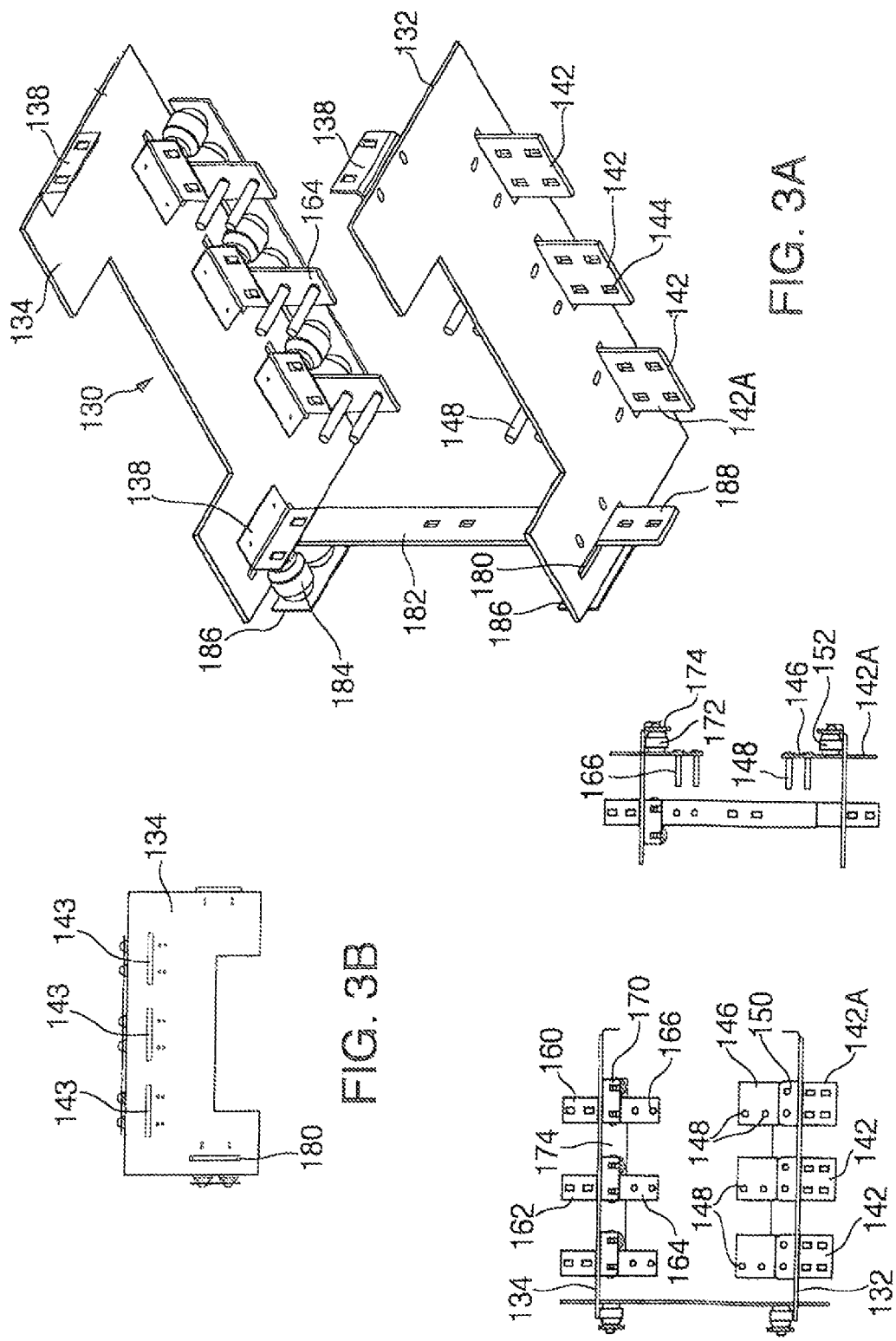

ELECTRICAL METERING AND SWITCHING EQUIPMENT

RELATED APPLICATIONS

None

BACKGROUND OF THE INVENTION

A. Field of Invention

This invention pertains to a novel metering and switching equipment that can be used to control and meter a 3-phase line having different voltage and current characteristics that meets UL standards.

B. Description of the Prior Art

Various national, local electrical codes as well as standard practices dictate that a power line (whether single or multiple phase) feeding a site or building must first be connected to a service equipment that provides power metering, and, optionally, control switching. Typically, this service equipment includes a generally vertical metal cabinet with an entrance point receiving the incoming conductors from the bottom and an exit point at the top through which the outgoing conductors are exiting. In between the entrance and the exit points, terminations are provided for conductors, which are then interconnected either directly by copper bars, or through a over-current protection device. Standard current and voltage transformers are also provided which monitor the power flowing through the conductors and generate signals indicative of this power to a meter. Service equipment for this purpose is available from Delta Switchboard and Power, Inc. of Brooklyn, N.Y., and Nay-Tech, Inc. of Brooklyn, N.Y. These devices are customized to meet the requirements of the local electrical company, Consolidated Edison, having certain standard conductors as the input conductors. However, these devices cannot be used in other parts of the country serviced by other power companies having different requirements.

Moreover the equipment provided by these company are rated at a top fault currents of up to 50K Amps as defined by the respective UL standards.

In other words the interior arrangement and size of the existing equipment is tied to the requirements of the local power company and they cannot be used in other venues.

SUMMARY OF THE INVENTION

In a preferred embodiment, an electrical system is provided for electrical service to a building or other venue, the system including a first portion and a second portion. The first portion is configured to receive a meter pan for measuring power consumption. This first portion includes first power connection members adapted to connect to a first plurality of multiphase power conductors. The second portion is configured to receive a switch and is connected to a set of intermediate connectors. The second portion also includes second power connection members adapted to connect to a second plurality of multiphase power conductors. The switch is configured when installed to selectively switch current between said first and second power connection members through said intermediate connectors.

The first portion includes a transformer subassembly including a first horizontal plate, a second horizontal power plate. The plates are made of an electrically insulating material. The subassembly also includes a first set of buses passing through said first plate and a second set of buses passing through said second plate. Each bus includes a first bus portion adapted for connection to one of said intermediate connectors and said power connection members and a second bus portion adapted to connect to the meter pan.

The plates are sized and constructed to maintain said buses in a preselected spaced arrangement when said buses are subjected to an excessive short circuit current.

BRIEF DESCRIPTION OF THE DRAWINGS

FIG. 2D shows a front elevational view of the assembly of FIG. 2A;

FIG. 2E shows a plan cross-sectional view taken along lines A-A in FIG. 2O;

FIG. 2F is a top or plan view of the assembly of FIG. 2A;

FIG. 3A shows an isometric view of the transformer subassembly forming a part of the assembly of FIG. 2A;

FIG. 3B shows a bottom view for the barrier of the subassembly of FIG. 3A;

FIG. 3C is a front elevational view of the subassembly of FIG. 3A;

FIG. 3D is an end view of the subassembly of FIG. 3A; and

DETAILED DESCRIPTION OF THE INVENTION

Figure 1A:
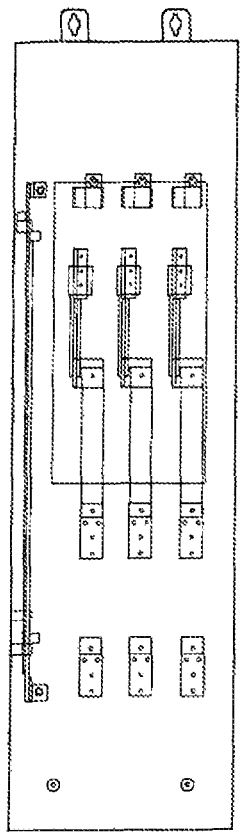
FIGS. 1A-D show a typical prior art electrical switching assembly.
Figure 1B:
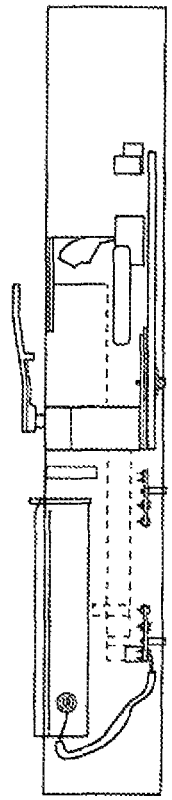
Figure 1C:
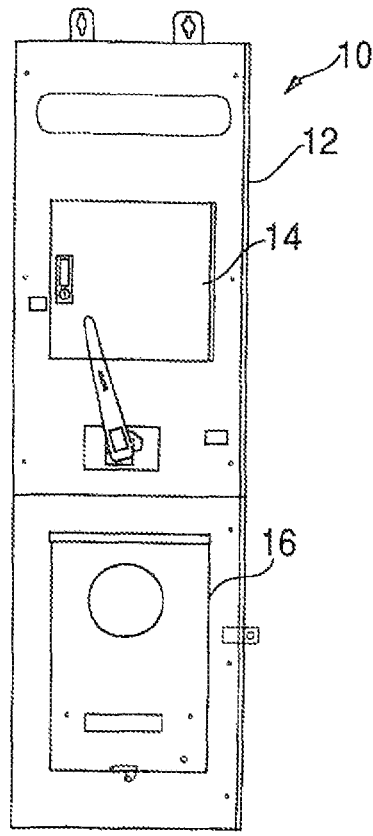
Figure 1D:
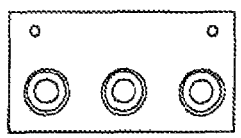

Referring first to FIGS. 1A-1D, a typical prior art assembly 10 includes a cabinet 12 is used to house two devices (best seen in FIG. 10): a meter device 14 and a three-phase disconnect switch 16. The relative positions of the two devices depends on two factors: the entry point for the incoming (line) cables and the voltage of the lines. In FIGS. 1A-D, the incoming cables are connected from the top and the outgoing cables (going to the load) are connected at the bottom. For low voltage lines (typically under 480 vac) the meter 14 is on the line side. For high voltage line, the switch is on the line side. The switch 16 is normally a referred to as a mini bolted pressure switch, such as the ones made by the Boltswitch company of Crystal Lake, Ill., having an appropriate current and voltage rating.

Of special interest in this type of equipment are the cable connections, and more specifically the input cable connections. As previously mentioned, the problem with this arrangement is that there is insufficient space for these connections specially at the bottom of the cabinet 12 to accommodate different kinds of cables and hence could not be used universally for any location. Instead existing the cabinets can accept cables having either one kind of Cu/Al standard connection, or a connector having a proprietary design.

The present inventor has developed a service equipment having a novel arrangement. A preferred embodiment of this novel equipment is illustrated in FIG. 2A-FIG. 2F. The assembly 100 includes a cabinet 102 with openings 104 for cables (not shown) provided in the top surface. The assembly 100 is arranged for 3 phase high voltage service with the incoming (line) cables being provided from the top and the exiting (load) cables exiting from the bottom.

The cabinet 102 is preferably sectioned into two segments 110, 112. In this case the top segment 110 holds a switch 114 and the bottom segment 112 holds a meter pan 116 with an opening 118 receiving a standard meter (not shown). The front surface of the cabinet 102 is formed by two covers 120, 122 that are removable to provide access to the respective devices and related connections.

Figure 2A:
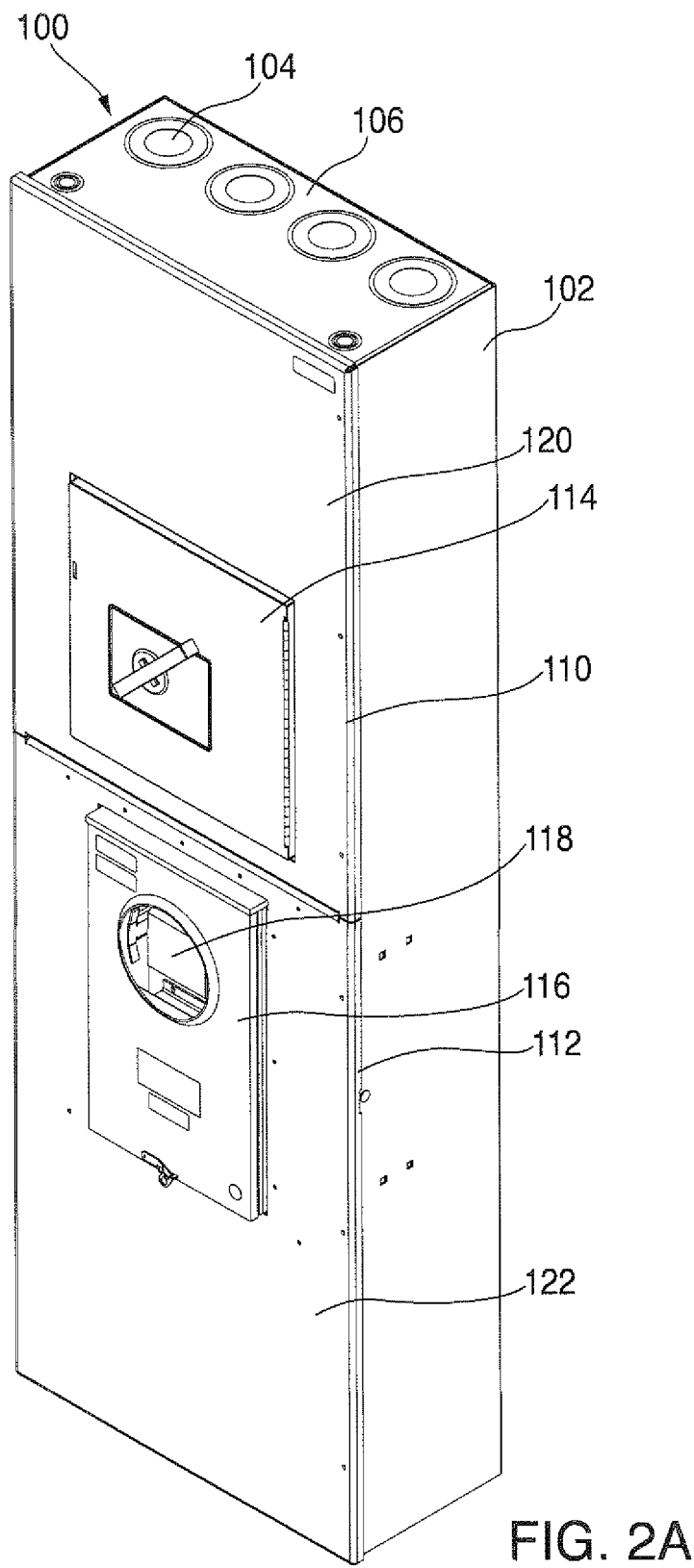
FIG. 2A shows an isometric view of a complete assembly constructed in accordance with this invention.
Figure 2B:
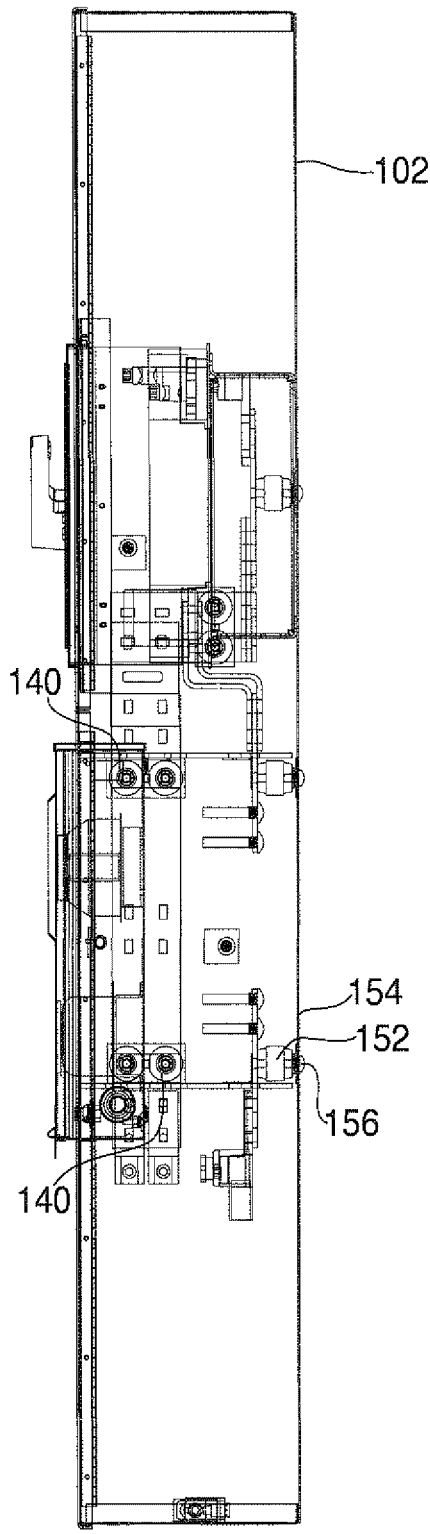
FIG. 2B is a side cross-sectional view of the assembly of FIG. 2A.
Figure 2C:
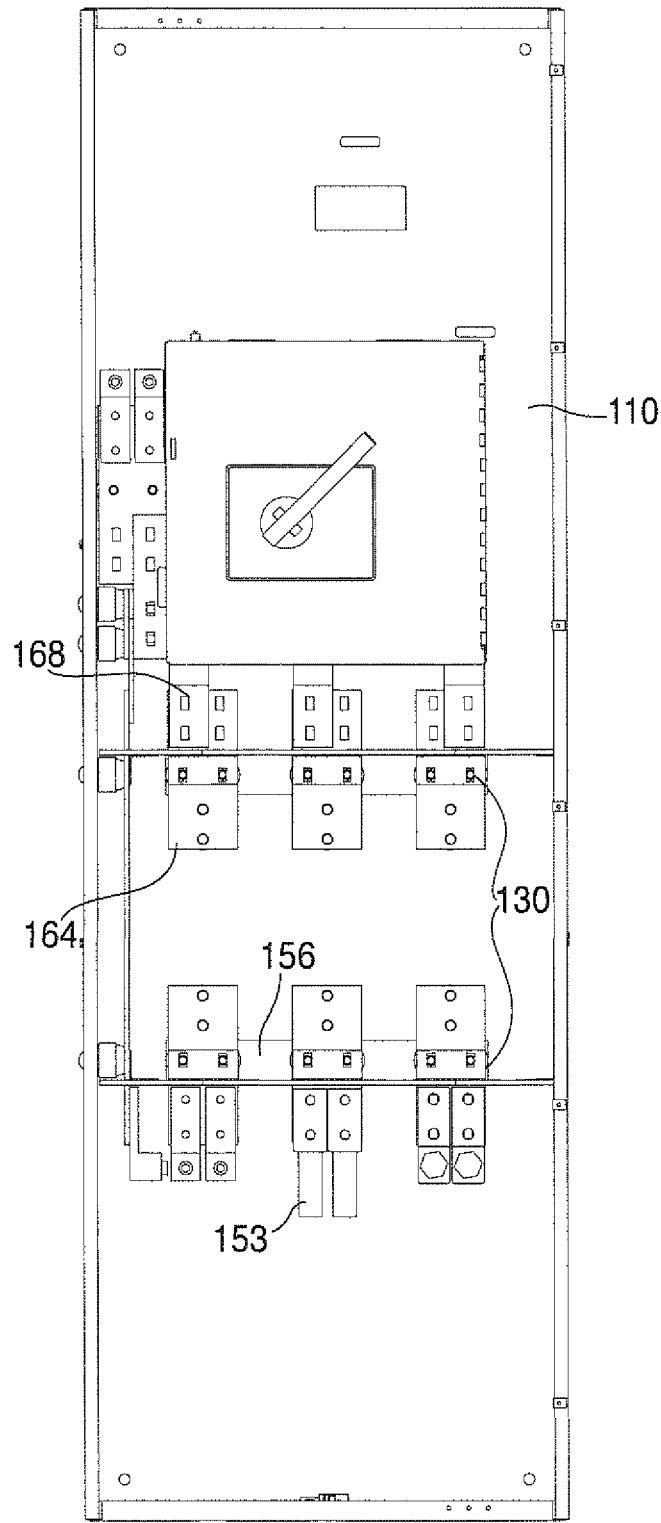
FIG. 2C shows a front elevational view of the assembly of FIG. 2A with covers removed.

Referring now to FIG. 2C, the lower segment 112 of cabinet 102 includes a transformer subassembly 130. This subassembly provides support for the incoming cables and also provides an interface to the conventional current and voltage transformers (not shown) associated with meter pan 116. Briefly, the incoming cables are connected to the switch 114. From the switch, the current is conducted by copper buses to the transformer subassembly 130 where the current flowing through the conductors and the actual voltage of the cables are measured by appropriate transformers and the resulting power is displayer and/or transmitted to a remote location by a meter installed in meter pan 116.

The subassembly 130 includes two horizontal, generally U-shaped plates 132, 134 made of glasstic or other material having very high electrical insulation properties. Preferably the plates are about ¼" thick. Each plate 132, 134 is provided with a set of support brackets 138. Brackets 138 are used to attach the plates 132, 134 to the side walls of cabinet 102. Typically, the brackets are mounted using barrel-shaped high voltage insulators 140 (seen in FIG. 2B) made by under the name of Mar-Bal, Inc. of Chagrin Falls, Ohio, or other similar insulators. (These insulators have been omitted from FIG. 2C for the sake of clarity.)

The bottom plate 132 is formed with openings (not shown) for three bus bars 142. The bottom portions 142A of each of the bus bars extending below the plate 132 are provided with several holes 144. These bus bar portions are arranged to provide a universal connection for the incoming 3-phase AC power cables (153—see FIG. 2C). As such, the bus bars can be provided to the customer as shown, or optionally, they can be provided with standard connectors such as barrel-type connectors of a suitable size.

The top portion 146 of each bus bar 142 is provided with a pair of carriage bolts 148 extending horizontally. The carriage bolts 148 are sized and spaced at a standard distance so that they can be connected to a standard bar-type utility metering coil (not shown) a well-known manner. The meter coils are field wired to the meter pan 116. In addition, the bus bars 142 are attached to brackets 150 similar to brackets 138 to independently support each of the bus bars 142 and related incoming cables (not shown). The brackets 150 are also attached to respective barrel insulators 152 that are attached to the back wall 154 of cabinet 102 either directly, or via a common mounting plate 156(see FIGS. 2b and 2C).

Similarly, the top plate 134, is formed with longitudinal openings (143) receiving bus bars 160 with a top portion 162 and a bottom portion 164. The bottom portions 164 support carriage bolts 166 that interface with the metering coil. The top portions 164 are attached to buses 168 (FIG. 2C) leading to switch 114. The bus bars 160 are supported by brackets 170 and, in turn, the brackets 170 are mounted on the back wall 154 by barrel-shaped insulators 172 directly or via a plate 174. Thus, bus bars 160 form a set of intermediate connectors between the metering coil section and the switch 114.

Plates 132, 134 are also provided with a lateral opening 180. This opening receives a neutral bus 182. The neutral bus is supported at the plates 132, 134 by its own bracket 138, insulators 184 and (optionally) a plate 186. A bottom part 188 of the neutral bus is connected by conventional means to either a ground connection (not shown) or to an appropriate neutral cable (not shown).

The transformer subassembly 130 thus provides the connections necessary for the metering pan 116. Importantly, the arrangement shown is designed to provide a very high circuit fault. More specifically, the two plates position and space the bus bars appropriately to insure that when a short circuit fault occurs, the subassembly withstands a 50,000 amp short circuit assuming the bus bars have a standard width of 3½" and a thickness of ¼". Moreover, if the bus bars are increased to 4" the panel 100 is able to withstand short circuits of up to 100,000 amps. Moreover, if a switch with an integral class J or class L fuse is used, the resulting assembly is rated a 200,000 symmetrical amp short circuit.

As previously mentioned, prior art systems used Boltswitch bolted pressure contact switches. The present inventor has found that a high contact pressure or HCP switch such as the one made by the Siemens Corporation of Washington D.C. provides several advantageous. First, while in typical situations, Siemens recommends mounting HCP switches in a horizontal orientation (wherein the line and load cables enter the switch horizontally), the inventor has discovered that mounting the same switch vertically is also possible. As a result, as seen in the drawings, the bus bars and cables can be readily connected along respective vertical axes thereby reducing the required width of the cabinet 102. Moreover, when mounted vertically, the switch requires less space than a bolted pressure contact switch having the same rating. A further advantage of this switch pertains to remote indications. The switches discussed herein optionally include overload sensing circuitry, said switches tripping (if present) when certain overload conditions are determined. However, the HCP switch optionally includes indicator circuitry and/or contacts that can be used remotely to determine the condition of the switch and what caused an automatic tripping. HCP switches are available having a wide range of ratings, including 400, 600 and 800 amps and 3-phase voltages from 240 vac to 600 vac. The Boltswitch device does not have a 600 amp rated device.

Figure 4:
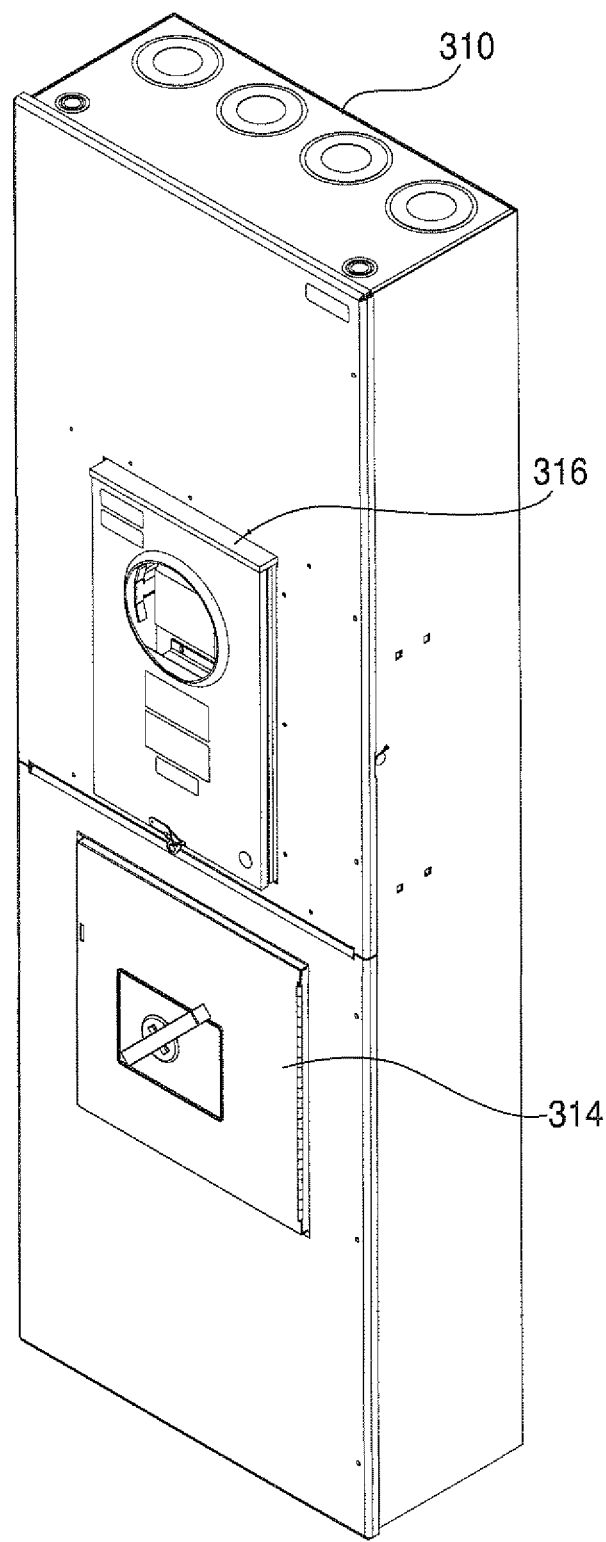
FIG. 4 shows an isometric view of an alternate embodiment.

In the embodiments of FIGS. 2 and 3 an arrangement is shown in which the metering section is disposed on the bottom and the switch is on the top. These two devices may be reversed, depending on the line voltage and the location of the line and load cables. Moreover, some customers require only a metering device. In such cases, the section with the metering pan is raised so that the meter is at eye level. Otherwise the structure is very similar to what is shown in the drawings. An equipment 310 with the metering device 316 on top and a switch 314 on the bottom is shown in FIG. 4.

To summarize, prior art electrical equipment provided at the service entry point of buildings and other venues are typically custom built to the requirements of the local power company and/or local codes. They use locally provided meter pans receiving an electrical meter measuring power consumption and, optionally, a bolt pressure switch. The line and load connections are accomplished using either lugs that are not approved by NEMA or proprietary Al/Cu mechanical lugs. The resulting equipment have several disadvantages. They are rated for a short circuit interruption of up to only 50,000 amps. They do not have internal barriers or other forms of protection against falling objects within the cabinets. They are limited to Cu/Al type connectors for all conductors. Typically they are available only in 400 amp or 800 amp models. Their switching devices are limited to their UL listing to six times their maximum current rating in a make-and-break/open close operation.

The equipment disclosed herein can be configured for a short circuit interruption rating of 100,000 amps, or 200,000 amps with fusing. The plates 132, 134 provide consistent separation between the respective busses and also insure that tools and other small parts to do not fall on the live elements of the system, such as the busses.

Sufficient room is provided above and below the devices housed in the cabinet to accept any UL listed two mount lugs regardless of whether they are Cu/Al mechanical lugs, compression lugs, copper terminals, etc. Therefore the customer can have a choice of buying cable terminations from any source. The system can be configured to provide 400, 600 or 800 amp switched service.

The HCP switch used in the system is rated at 10 times the maximum switched current in a make-or break/open-close operation, The HCP switch can be provided with various options, including a field installable shunt trip kit, an alarm kit that can provide a remote signal when the switch is tripped due to a specific condition as opposed to being manually operated, The HCP switch can also be provided with an auxiliary switch providing switch position indication to a remote location.

The elements of the system, such as the meter pan is UL listed. The same configuration can be advantageous used for various applications without changing the overall dimensions of the cabinet.

Numerous modifications may be made to the invention without departing from its scope as defined in the appended claims.

I claim:

1. An electrical system providing electrical service to a building or other venue, the system comprising:
 a first portion configured to receive a meter pan for measuring power consumption, said first portion including first power connection members adapted to connect to a first plurality of multiphase power conductors;
 a set of intermediate connectors
 a second portion configured to receive a switch, said second portion being connected to said intermediate connectors and including second power connection members adapted to connect to a second plurality of multiphase power conductors said switch being configured when installed to selectively switch current between said first and second power connection members through said intermediate connectors;
 wherein said first portion includes a transformer subassembly including a first horizontal plate, a second horizontal power plate, said plates being made of an electrically insulating material; a first set of buses passing through said first plate, a second set of buses passing through said second plate, each bus including a first portion adapted for connection to one of said intermediate connectors and said power connection members and a second portion adapted to connect to said meter pan;
 wherein said plates are sized and constructed to maintain said buses in a preselected spaced arrangement when said buses are subjected to an excessive short circuit current.

2. The system of claim 1 wherein said portions are disposed vertically above one another.

3. The system of claim 1 wherein said first portion is disposed above the second portion.

4. The system of claim 1 wherein said first portion is below the second portion.

5. The system of claim 1 wherein said first plurality of power connection members are adapted to connect to line power conductors and said second plurality of power conductors are adapted to connect to load power conductors.

6. The system of claim 1 further comprising said switch, wherein said switch is an HCP switch.

7. An electrical system providing power to a building or other venue from a plurality of multiphase line conductors through a plurality of multiphase load conductors, comprising:
 a cabinet;
 a first portion configured to receive a meter pan for measuring power consumption, said first portion including first power connection members adapted to connect to a first plurality of multiphase power conductors;
 a set of intermediate connectors
 a second portion configured to receive a switch, said second portion being connected to said intermediate connectors and including second power connection members adapted to connect to a second plurality of multiphase power conductors said switch being configured when installed to selectively switch current between said first and second power connection members through said intermediate connectors;
 wherein said first portion includes a transformer subassembly including a first horizontal plate, a second horizontal power plate, said plates being made of an electrically insulating material; a first set of buses passing through said first plate, a second set of buses passing through said second plate, each bus including a first portion adapted for connection to one of said intermediate connectors and said power connection members and a second portion adapted to connect to said meter pan;
 wherein said portions are disposed vertically with respect to each other within said cabinet, and said plates are sized and constructed to maintain said buses in a preselected spaced arrangement when said buses are subjected to an excessive short circuit current.

8. The system of claim 7 wherein said first portion is disposed above the second portion.

9. The system of claim 7 wherein said first portion is below the second portion.

10. The system of claim 7 wherein said first plurality of power connection members are adapted to connect to line power conductors and said second plurality of power conductors are adapted to connect to load power conductors.

11. The system of claim 7 further comprising said switch, wherein said switch is an HCP switch.

12. The system of claim 7 further comprising a first set of insulators supporting said plates on said cabinets.

13. The system of claim 7 further comprising a second set of insulators supporting said buses within said cabinet.

14. The system of claim 7 further comprising a neutral bus passing through said plates and being supported on said cabinet.

15. The system of claim 7 wherein said buses and plates are arranged to conduct a short circuit current of about 100,000 amps ac without damage.

16. The system of claim 7 wherein said switch is fused and wherein said buses and plates are arranged to conduct a fault symmetric current of 200,000 amps.

* * * * *